Patented Mar. 21, 1933

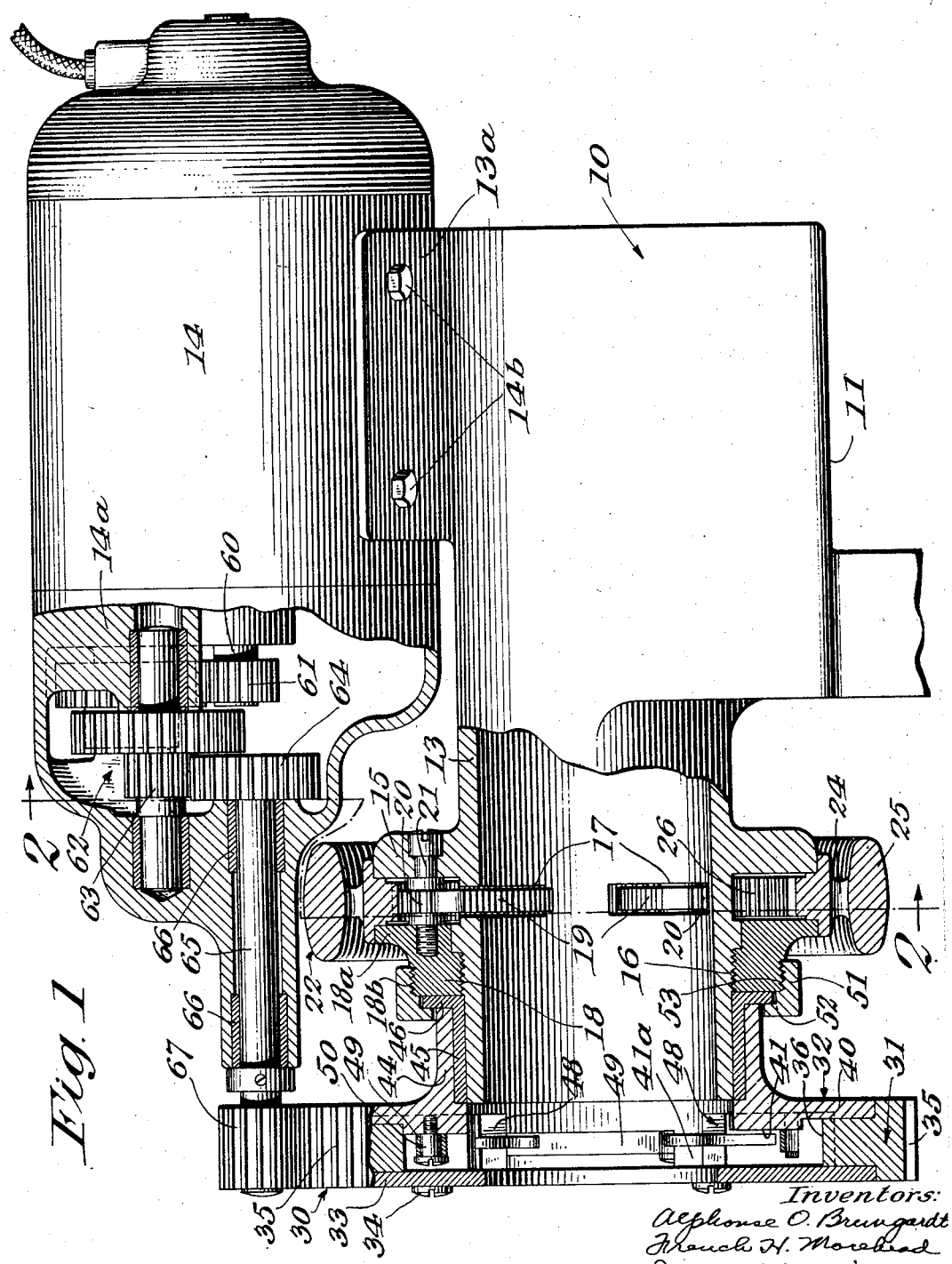

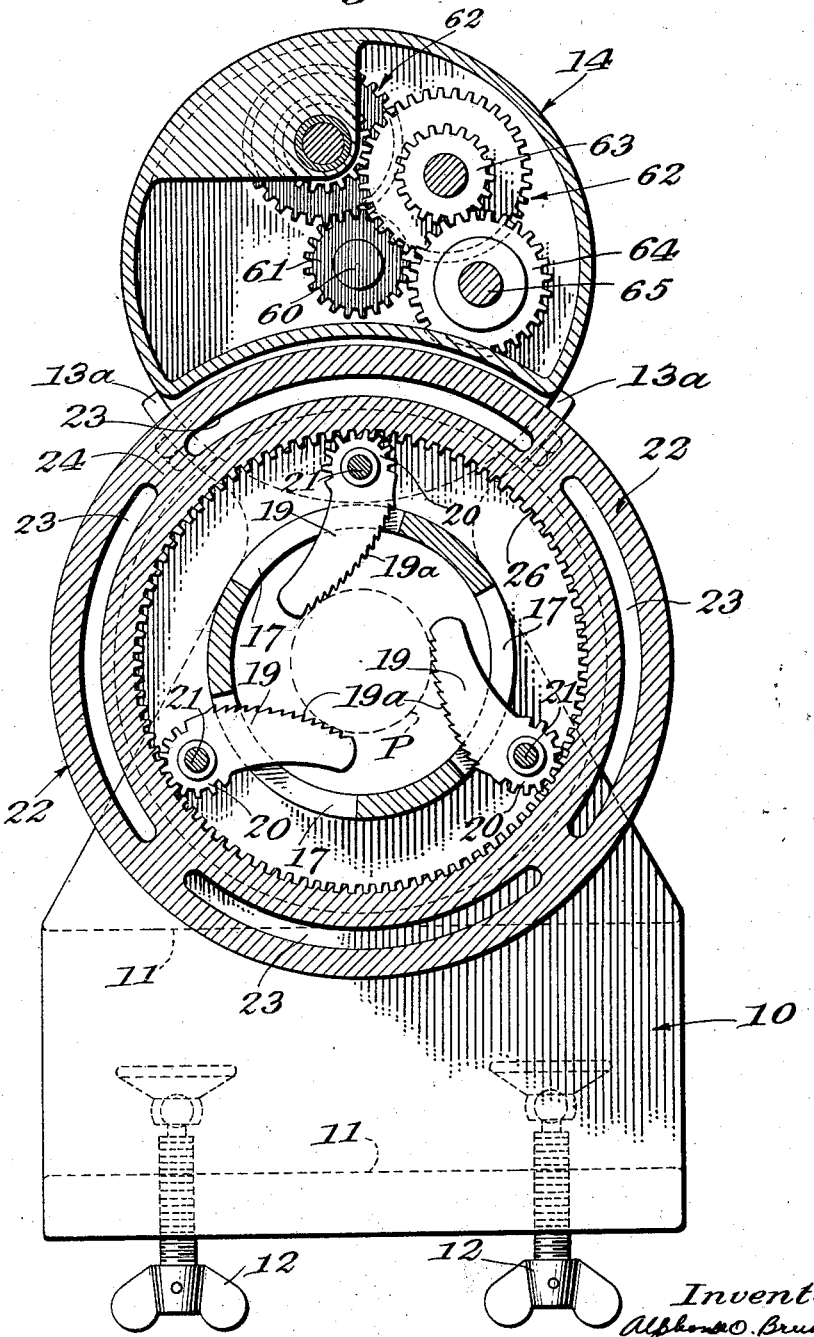

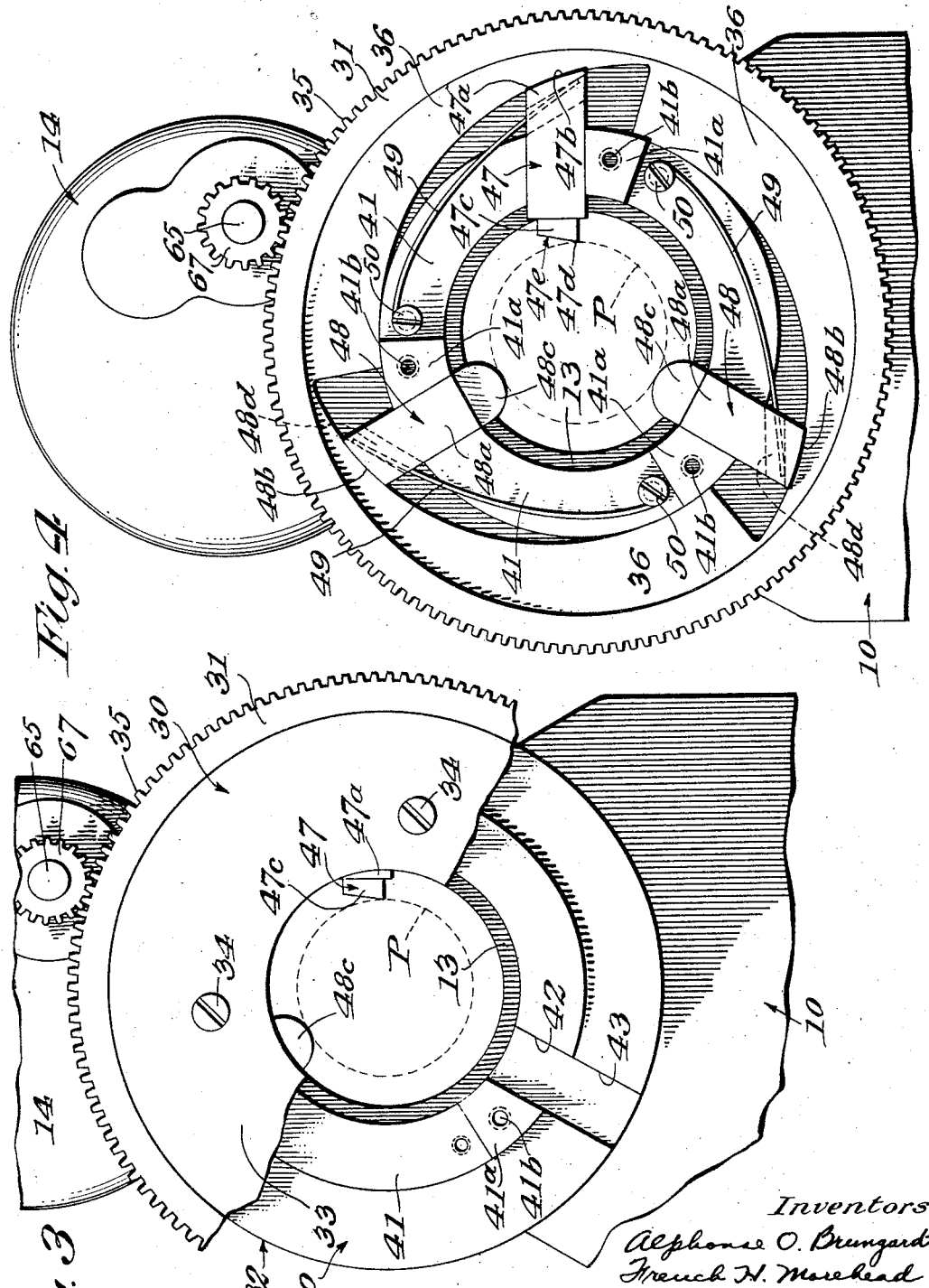

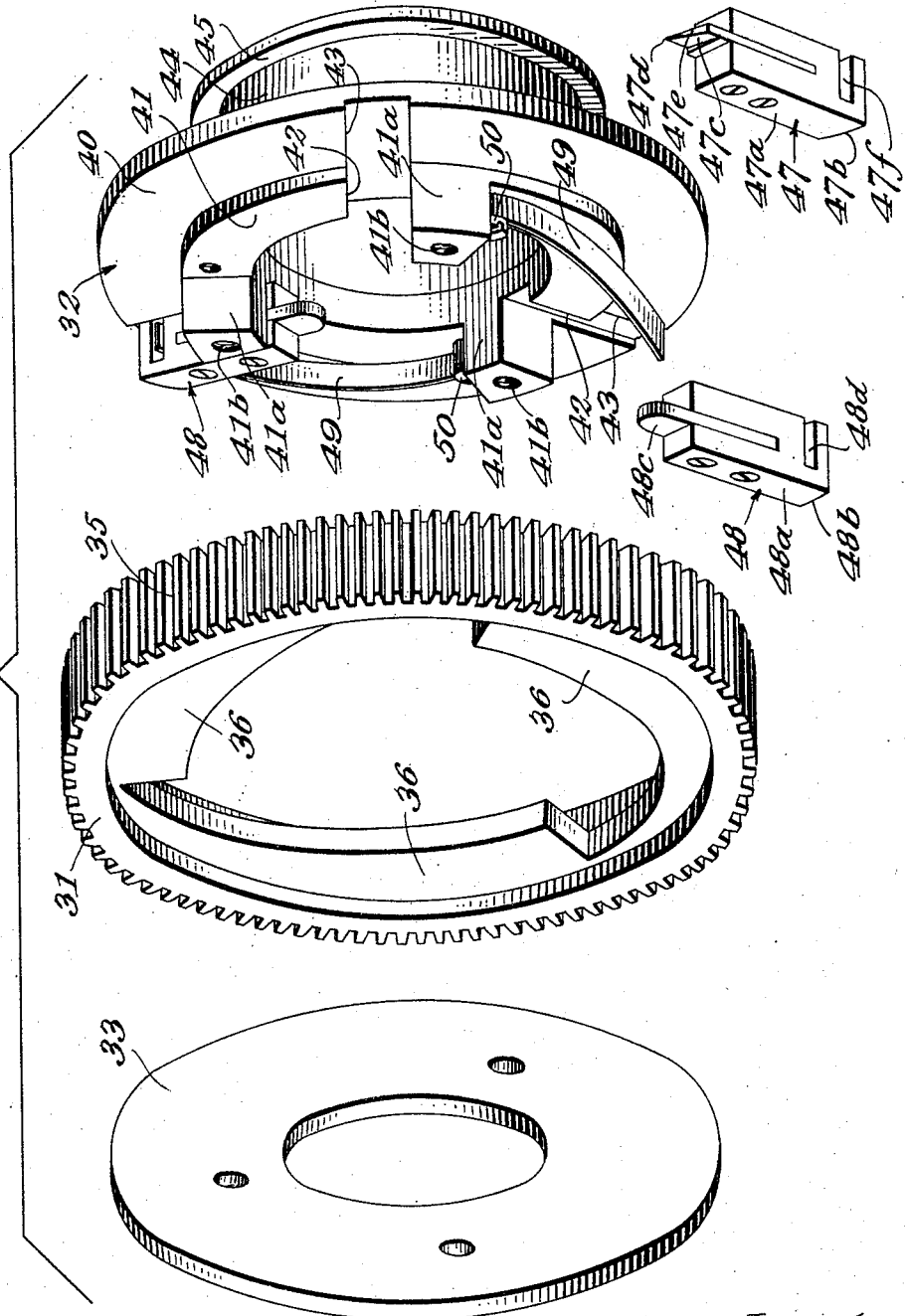

1,902,616

UNITED STATES PATENT OFFICE

ALPHONSE O. BRUNGARDT, OF SCITUATE, FRENCH H. MOREHEAD, OF BROOKLINE, AND JAMES W. MORRISSEY, OF MEDFORD, MASSACHUSETTS

PORTABLE PIPE CUTTER

Application filed June 27, 1930. Serial No. 464,222.

This invention relates to pipe cutting devices such as are in common use by steam fitters and plumbers. These present pipe cutting devices are generally of two classes, viz:—hand cutters consisting either of single or multiple cutter wheels, or square nose tools which are manually operated toward and into the walls of a pipe, and which are also manually rotated around the pipe; and, pipe cutting machines of large and heavy proportions, usually comprising a bed or base having supporting legs, and power operated means including gearing or belt mechanism for rotating the pipe against a stationary tool.

One of the objects of our invention is to provide a light, hand portable, power operated pipe cutting device which will replace present hand operated pipe cutters, as well as the heavier types of pipe cutting machines used in large construction projects, which machines can only be moved from one location to another with great difficulty due to their large size and heavy weight.

Our pipe cutting device is distinguished from the two general types of devices or machines now in common use, in that our device is relatively light and compact, making it capable of being easily transported from place to place. The device comprises a unitary structure including a supporting base, a pipe receiving cylinder mounted upon the base, and a rotary head provided with pipe cutting and centering members mounted upon the pipe receiving cylinder and adapted to be rotated relative to the cylinder by means of an electric motor carried by the device and forming a fixed and substantially permanent part of the device, said motor being preferably mounted upon the pipe receiving cylinder and serving to rotate the cutting head around a pipe to be cut to propel the cutting and centering members of the head progressively into the walls of the pipe to cut and sever the pipe. The unitary structure forming the device of our invention also includes pipe-holding and gripping mechanism which includes members capable of being manually brought into contact with a pipe to be cut to center and lock the pipe in position within the pipe receiving cylinder and maintain it against rotation relative to the cylinder and cutting head, during the rotation of the head while cutting and severing the pipe. Our pipe cutting device may be secured in a vise and the pipe to be cut fed through the pipe cutter; the pipe itself may be secured in a vise and the pipe cutter slipped over the pipe; or, the pipe cutter may be laid on a bench or on the floor and the pipe inserted into the cutting device or head. It will thus be seen that our improved pipe cutting device may be used in various ways and that by providing an electric motor or power means for rotating the cutting head, as a part of the structure, the whole device may be moved from place to place, as desired.

In operation, a pipe is inserted into the pipe receiving cylinder and the holding and centering jaws or members are actuated by hand to bring them into contact with the pipe to lock it against rotation. The electric motor is then started and the cutter head revolves around the pipe. As the cutting head rotates around the pipe, the cam member or members forming a part of the head engages and propels the cutting and centering members progressively into the pipe as the head revolves, to perform the cutting operation. Upon completion of the pipe cutting operation, the pipe gripping or holding device is released by hand, whereupon the pipe may be withdrawn from the pipe receiving cylinder, or may be moved into position for another cutting operation. Our device is capable of cutting pipes of various sizes and diameters, without the necessity of making any adjustment whatsoever to any of its parts.

Other objects of the invention will appear from the following description and appended claims, when taken in conjunction with the accompanying drawings illustrating one preferred embodiment of our invention, in which like reference characters designate corresponding parts in the several views.

In said drawings:

Fig. 1 is a side elevational view, partly in section, of the device of our invention.

Fig. 2 is a vertical section through the machine taken substantially along the line 2—2 of Fig. 1, and showing our improved pipe gripping and holding means.

Fig. 3 is a fragmentary front elevation of the machine, partly broken away.

Fig. 4 is a view generally like that of Fig. 3, with the cover plate removed to expose the cutting and centering members of the rotary head.

Fig. 5 is a disassembled perspective view of the parts of the rotary head, showing their construction and relationship.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

Referring now to the drawings, 10 designates as a whole the supporting base or frame structure of the device, slotted at 11 to permit it to be slipped over the edge of a work bench, or the like, by which it may be desired to support the device. If desired, the base may be provided with a pair of clamping screws 12, which project into the space 11 and may be adjusted to engage the surface by which the machine is supported.

The device of our invention includes a pipe receiving member or housing which may be formed integral with the supporting base 10, and which, as shown, is preferably in the form of an open ended cylinder or tube 13.

The cylinder is provided on opposite sides adjacent its rear end portion, with flanges or outwardly flared extensions 13a, which together form a saddle or support for an electric motor designated as a whole at 14. The motor comprises a casing 14a which is secured to the saddle by means of bolts or the like 14b. Thus it will be seen that the electric motor forms a substantially fixed part of the whole device and is as rigid as though it were an integral part of the structure. The cylinder 13 is provided with an external flange or projection 15 toward its forward end and which serves as part of the supporting structure for a manually operable pipe clamping and gripping device which centers the pipe and holds or locks it against rotation. This mechanism is described in detail hereinafter. The cylinder is also provided, at a point spaced from the flange 15, with external screw threads 16, and with a series of slots or openings 17 formed through the walls of the cylinder at a point located between the flange 15 and the screw threads 16. Threaded onto the cylinder and engaging the threads 16, is a removable annular ring or member 18, having a projecting portion or flange 18a, and external threads 18b. It will be seen that when the annular ring 18 is in place on the cylinder, as shown by Fig. 1, the flange 18a thereof will be spaced from and parallel to the inner wall of the flange 15. When assembled, the flanges 15 and 18a form supporting means for a series of locking dogs or jaw members designated as a whole at 19 (three such members being shown). The inner ends of the dogs 19 project through the slots 17 and their outer ends or heel portions are preferably provided with gear teeth forming semi-circular racks or segments 20. The dogs are held in place by means of screw threaded studs or bolts 21, which not only serve as supporting bearings for the dogs, but also serve to maintain the flanges 15 and 18a in spaced relation against accidental movement or displacement. Located between the flanges, is the inner portion or hub of a dog actuating wheel or member, shown as a whole at 22, which is manually operated. This wheel comprises a portion of the pipe centering and holding mechanism, and is slotted circumferentially at 23 to provide a light construction, thus forming spokes 24 which separate the inner portion or hub of the wheel and the outer or rim portion 25 of the wheel. The rim 25 forms a portion adapted to be gripped by the hand of the operator to rotate the wheel around the cylinder 13 relative to the flanges 15 and 18a. The inner periphery of the wheel 22 is provided with a series of gear teeth forming an annular rack 26, which, when the parts are assembled, as shown by Figs. 1 and 2, meshes with the segments or teeth 20 of the dogs. In Fig. 1, it will be seen that the wheel has a portion of its hub located between and slidingly fitting within the flanges 15 and 18a, and a portion which bridges these flanges. With the parts assembled as shown, it will be understood that by grasping the rim 25 and moving the wheel in a clockwise direction, the dogs will be withdrawn from engagement with the pipe P, whereas, when the wheel is rotated in the opposite or counter-clockwise direction, these dogs are forced into engagement with the pipe P to grip or clamp the same in position within the cylinder 13 and hold or lock it against rotation relative to the cylinder. These dogs also locate or position the pipe centrally with respect to the cylinder 13. The dogs 19 are preferably provided with a series of teeth or spurs 19a formed in their inner edges, which teeth or spurs are preferably positioned at an angle to the periphery of the pipe and serve to bite into the surface of the pipe and lock the pipe against rotation, when the tendency of the pipe is to rotate in a clockwise direction.

Referring now particularly to Figs. 1, 3, 4 and 5 the improved rotatable head or unit of our invention, which carries the cutter and centering devices, is designated as a whole by the reference character 30. This head or unit comprises, preferably, two relatively movable cooperating and interfitting members, which may be conveniently referred to as a driving member 31 and a driven member 32. When these members are assembled, they are held together against accidental disengagement in an axial direction, by means of a cover plate or ring 33 which is detachably secured to the driven member 32 by means of screws or the like 34. The plate, however, permits rotative movement of the members relative to one another. The driving member 31, as shown, is preferably in the form of a ring having an external peripheral gear or rack 35, and having an internal series of cam members or portions each of which is shown as a whole at 36.

The driven member 32 is preferably in the form of an annular ring 40 having on its inner face an annular upstanding rib or portion 41 which is broken away or cutout to provide substantially radial slots or spaces 42 located at predetermined spaced intervals. These slots are formed to register and cooperate with substantially radial slots or grooves 43 formed in the inner face of the ring 40. At points adjacent the slots 42 and 43 are located preferably, on one side of said slots, the annular rib 41 is provided with portions 41a which are raised slightly above the top face of the rib 41. That is to say, the portions 41a are of greater depth than the rib 41. Each of the portions 41a is drilled at 41b to receive the screws or bolts 34, which serve to hold the cover plate 33 in position. Thus it will be seen, that the rib 41 is reduced in depth between the portions 41a and that the top of the rib lies below the cover plate 33 when the parts are assembled, to provide spaces for receiving springs, to be hereinafter described. The ring 40 is provided on its external face with a hub portion 44 into which is preferably pressed or forced, a brass ring or bushing 45 having a flange 46. This bushing 45 is forced into the hub under pressure so that the ring and hub have the appearance of a solid or one piece construction, and serves as though the bushing were formed integral with the hub.

Fitting within the cooperating slots 42 and 43, and slidable in these slots in a substantially radial direction, are cutting tools and pipe centering members. In the preferred embodiment of our invention illustrated in the drawings, a single cutting tool, designated as a whole at 47, and two pipe centering members, each of which is designated as a whole at 48, are shown, although any desired number of cutting tools and centering members may be used. The cutter 47 comprises a body portion 47a having a tapered rear end portion or heel 47b which conforms to the shape of the face of the cam members 36, and a cutting blade 47c which is preferably tapered to provide a cutting tip 47d and a clearance 47e. The body 47a is preferably slotted at 47f to receive the free end of a spring 49 which is secured to the top of the rib 41 in any suitable manner, as by means of a screw 50. The tendency of the spring is to maintain the rear end or heel 47b of the cutting member or tool in contact with the cam surface. Each of the pipe centering members 48 comprises, preferably, a body portion or slide 48a having a tapered rear end or heel portion 48b which conforms to the shape of the inner surface or face of the cams 36, and with a relatively thin and rounded or convex tip or pipe engaging portion 48c. Adjacent its rear end, each slide is slotted at 48d to receive the free end of a spring 49, similar to the spring referred to in connection with the cutting tool or member 47. This spring is also secured to the face of the rib 41 by means of a screw or the like 50. It will be understood that the cutting tool or member 47 and the pipe centering members 48, are adapted for free sliding movement in the slots 42 and 43 and may be moved inwardly in a substantially radial direction when the cam members or surfaces 36 are moved relative to them. It will also be understood that the springs 49 serve to maintain the cutting tool and pipe centering members normally in position in the head against accidental displacement.

As seen in Fig. 1, the hub 44 of the rotatable head supports a slidable locking ring or member 51 having a flange 52 and an internal threaded portion 53. When the rotatable head is assembled and the bushing 45 thereof slipped over the outer end of the cylinder 13, the locking ring is brought into engagement with the flange 18 whereupon the threads 53 and 18b cooperate as the flange is rotated, to lock the head in position on the cylinder, and to prevent its accidental removal or movement axially with relation to the cylinder, yet permitting the head to be rotated freely around the cylinder. In this connection, it will be noted that the flange 52 engages the flange 46 of the bushing to prevent such accidental axial movement or displacement of the head.

The electric motor 14 is preferably supported by the saddle 13a at one side of the cylinder, and may be of any conventional type, comprising a casing 14a which supports at its forward portion a gear train driven from a drive shaft 60 through a pinion 61, the gear train being designated as a whole by the reference character 62. The gear train includes a pinion 63 which is in mesh with a pinion 64 fixed upon the inner end of a jack shaft 65. This shaft is rotatably mounted in bearings or bushings 66, located in the forward extension of the motor housing. The jack shaft extends forwardly beyond the housing and has fixed to its outer end a pinion 67 which meshes with the annular gear or rack 35 formed on the driving member of the rotatable head. Thus it will be seen, that power is transmitted from the motor shaft 60 through the gear train, jack shaft and pinion to the rack or gear 35.

To use the pipe cutting device of our invention, the rim 25 is grasped and moved in a clockwise direction to retract the dogs 19, whereupon a pipe may be inserted through the opening in the head and into the cylinder 13. The wheel is then moved in the opposite, or counter-clockwise direction, and the rack 26 engaging the segments 20, forces the dogs into engagement with the pipe P, causing the teeth or spurs 19a to embed themselves into the external surface of the pipe to grip and lock the pipe against rotation relative to the cylinder 13. The dogs 19 also center the pipe within the cylinder. The electric motor is now started and the driven member 31 is rotated in a clockwise direction, thus moving the cam surfaces 36 over the rear end portions or heels 47b and 48b of the cutting tool and pipe centering devices, respectively, to force the cutter and the centering members into engagement with the pipe. The initial rotative movement of the member 31 is relative to the driven member 32 due to the slippage of the parts. During the rotation, the cams act as wedges and when these cams have forced the cutter and centering members into contact with the pipe, the wedging action of the parts, causes the driven member 32 of the head to rotate with the driving member 31, so that the whole head with its cutting tool and centering devices, revolves around the pipe. It will be understood that as the cutter cuts a groove in the outer wall of the pipe, the centering devices 48c will be forced by the cams 36 into the groove so that there is a substantially simultaneous inward or progressive movement of all of the members in a substantially radial direction. The radial progressive movement of the members toward the pipe causes the cutter to cut deeper into the pipe, and since there is a slippage between the driving member 31 and the driven member 32, the cam surfaces are permitted to ride further over the rear ends or heels of the cutter and centering members to compensate for the metal removed by the cutting tool or tools. This progressive inward or substantial radial movement of the cutter or cutters and centering members is practically continuous until the pipe has been cut through and severed. It will be understood, that during the progressive inward and simultaneous rotative movements of the cutting tool and centering members, the cutting tool is slightly in advance of both of the centering devices, due to the variation in the depth of the cut made by the cutting tool. After the cutting operation has been completed the motor is shut off, whereupon the springs 49 come into play and tend to retract the cutting tool and centering members from engagement with the pipe. The gripping mechanism can be readily retracted manually to release the pipe so that it can be removed from the supporting cylinder 13, or moved ahead to permit a further cutting operation to be performed.

From the foregoing it will be seen that we have provided a pipe cutting device which is hand portable and power operated, the power being supplied by an electric motor which forms a fixed part of the unitary structure of the device, and one which is automatic in operation after the pipe has been inserted and the gripping mechanism manually adjusted to grip and lock the pipe against rotative movement, and the motor started. Moreover, it is to be noted that the relative rotative movement or slippage of the driving member 31 and the driven member 32 of the rotatable head, permits the single driving gear or pinion 67 to perform the dual functions of forcing the cutter and centering devices into engagement with the pipe, and also to rotate the entire head structure or unit around the pipe to cut and sever the same.

We claim:

1. A hand portable, power-operated pipe cutting device adapted to cut and sever pipe of various sizes and diameters, comprising a rotatable head, cutting and centering members carried by said head, cam means forming a part of said head and adapted to engage said cutting and centering members to propel them inward simultaneously and progressively toward the center of the pipe when the head is revolved, means for gripping a pipe and supporting it centrally within the rotatable head, and an electric motor forming a fixed part of said device for rotating one of said head members to first cause movement of the cutting and centering members by the cam means into engagement with the pipe and then automatically to rotate said head members as a unit to cut and sever the pipe.

2. A hand portable, power-operated pipe cutting device adapted to cut and sever pipe of various sizes and diameters, comprising a rotatable head, said head comprising relatively movable members, cutting and centering members carried by one of said head members, a cam member having integral cam sections carried by the other of said head members for engaging said cutting and centering members to move them inward simultaneously and progressively toward the center of the pipe when the head is revolved, a peripheral external gear also carried by one of said head members, means for gripping a pipe and supporting it centrally with respect to the head, and an electric motor forming a fixed part of said device having a pinion meshing with said external gear for rotating one of the head members to first cause movement of the cutting and centering members by the cams into engagement with the pipe and then automatically to rotate said head members as a unit to cut and sever the pipe.

3. A hand portable, power-operated pipe cutting device adapted to cut and sever pipe of various sizes and diameters, comprising a rotatable head having relatively movable members, pipe cutting and centering members carried by one of said head members, cams carried by the other of said head members and engaging said cutting and centering members, an external gear carried by said last mentioned head member, and an electric motor forming a part of said device having a pinion meshing with said external gear whereby upon operation of said electric motor one of said head members is rotated relative to the other of said head members to cause said cams to force said cutting and centering members inward toward said pipe to engage the same and on further rotative movement of said cams both of said head members are caused to revolve around the pipe, as a unit, to effect the cutting and severing of the pipe.

4. A hand portable, power-operated pipe cutting device adapted to cut and sever pipe of various sizes and diameters, comprising a rotatable head having relatively movable members, pipe cutting and centering members carried by one of said head members, cams carried by the other of said head members and engaging said cutting and centering members, an external gear carried by said last mentioned head member, means for gripping a pipe and locking it against rotation relative to said head, said means supporting said pipe centrally with respect to the head, and an electric motor forming a fixed part of said device having a pinion meshing with said external gear, whereby upon operation of said electric motor one of said head members is rotated relative to the other of said head members to cause said cams to force said cutting and centering members inward toward said pipe to engage the same and on further rotative movement of said cams both of said head members are caused to revolve around the pipe as a unit to cut and sever the pipe.

5. A hand portable power-operated pipe cutting device, comprising a supporting base, a pipe receiving cylinder carried by said base, a hand-operated pipe gripping and centering device carried by the cylinder and adapted to engage and hold a pipe to be cut against rotation, a rotatable cutter carrying head mounted upon the outer end of said cylinder, said head having an external annular gear formed thereon, a series of internal cam surfaces within the head, a pipe cutting tool and centering members located within said head and adapted to be engaged by said cam surfaces to move the cutting tool and centering members inwardly simultaneously into engagement with a pipe to be cut, spring means adapted to maintain said cutting tool and guides out of contact with the pipe, an electric motor forming a fixed part of the device carried by said cylinder at one side thereof and having a drive shaft and a pinion in mesh with said external gear for rotating said head around said pipe, whereby said cam surfaces are moved into engagement with said cutter and centering members to force them into engagement with the pipe to cut the pipe during the rotation of the head around the pipe.

6. A hand portable, power-operated pipe cutting device, comprising a supporting base, pipe receiving means carried by said support, pipe engaging and gripping means carried by the receiving means and adapted to hold a pipe to be cut against rotation, a cutter carrying head mounted upon one end of said pipe receiving means and adapted for rotation thereon, said head comprising relatively movable driving and driven members interfitting one another, said driving member having internal cam surfaces and said driven member having substantially radial slots formed therein, a cutter and centering members located in the guide slots and contacting with the cam surfaces, and an electric motor for rotating said driving member causing said cam surfaces to force said cutter and centering members into contact with the pipe to be cut, whereupon the frictional engagement of said cam surfaces, cutter and centering members and said pipe causes said driven member to be rotated by said driving member around the pipe to cut the same.

7. A hand portable, power-operated pipe cutting machine, comprising a support, a pipe receiving cylinder fixed to said support, a manually operated pipe gripping and centering device mounted upon said cylinder, a cutter head unit carried by said cylinder, said unit comprising a pair of relatively movable driving and driven members, said driven member having a pair of spaced plates one of which is provided with a hub portion rotatably mounted upon the outer end of said cylinder, and having substantially radial spaced slots formed therein, a cutter and pipe centering members located within said slots and movable therein toward and away from the axis of said member, said driving member being positioned between the spaced plates of said driven member and having an external peripheral gear and internal cam surfaces adapted to engage the cutter and pipe centering members to move them toward the axis of said cutter head and into engagement with a pipe to be cut located within the cylinder, and an electric motor carried by said cylinder having a driven shaft and a pinion in mesh with said external gear to rotate the driving member when the motor is operated, whereupon when said driving member is rotated the cam surfaces force said cutter and centering members into contact with the pipe to be cut and the frictional engagement between said cam surfaces and the cutter and centering members and said pipe imparts a rotative movement to the driven member to cause said members to rotate around said pipe to cut the same.

8. A portable power-operated pipe cutting machine, comprising a support, a pipe receiving cylinder fixed to said support, a manually operated pipe gripping and centering device mounted upon said cylinder, a cutter head unit carried by said cylinder, said unit comprising a pair of relatively movable driving and driven members, said driven member having a pair of spaced plates one of which is provided with a hub portion rotatably mounted upon the outer end of said cylinder and with substantially radial spaced slots formed therein, a cutter and centering members located within said slots and movable therein toward and away from the axis of said driven member, said driving member being positioned between the spaced plates of said driven member and having an external peripheral gear and internal cam surfaces adapted to engage the cutter and centering devices to move them toward the axis of said members and into engagement with a pipe to be cut located within the cylinder, and an electric motor carried by said cylinder having a driven shaft and a pinion in mesh with said external gear to rotate the driving member when the motor is operated, said cutter and centering members having spring means for moving them away from said pipe after the cutting operation has been completed.

9. A portable power-operated pipe cutting machine, comprising a support, a pipe receiving cylinder fixed to said support, a manually operated pipe gripping and centering device mounted upon said cylinder, a cutter head unit carried by said cylinder, said unit comprising a pair of cooperating relatively movable members, one of said members having a pair of spaced plates one being provided with a hub portion rotatably mounted upon the outer end of said cylinder and also having spaced substantially radial slots formed therein, a cutter and pipe centering means positioned within said slots and movable therein toward and away from the axis of said head member, the other of said head members being positioned between said spaced plates and having an external peripheral gear and internal cam surfaces adapted to engage the cutter and pipe centering means to move them toward the axis of said head members and into engagement with a pipe located within the cylinder, and an electric motor carried by said cylinder having a driven shaft and a pinion in mesh with said external gear to drive the same when the motor is operated, whereby slippage of said members during the initial rotative movement of the external gear causes said cam surfaces to engage said cutter and centering means to force them into engagement with a pipe to be cut and on further rotation of said gear the frictional contact of the cams, cutter, centering means and pipe causes both of said head members to rotate around the pipe to cut the same.

10. A portable power-operated pipe cutting machine, comprising a support, a pipe receiving cylinder fixed to said support, a manually operated pipe gripping and centering device mounted upon said cylinder, a cutter head unit carried by said cylinder, said unit comprising a pair of cooperating relatively movable members, one of said members having a pair of spaced plates one being provided with a hub portion rotatably mounted upon the outer end of said cylinder and also having spaced substantially radial slots formed therein, a cutter and pipe centering members positioned within said slots and movable therein toward and away from the axis of said member, the other of said head members being positioned between said spaced plates and having an external peripheral gear and internal cam surfaces adapted to engage the cutter and pipe centering members to move them toward the axis of said head members and into engagement with a pipe located within the cylinder, and an electric motor carried by said cylinder having a driven shaft and a pinion in mesh with said external gear to drive the same when the motor is operated, whereby slippage of said members during the initial rotative movement of the external gear causes said cam surfaces to engage said cutter and centering members to force them into engagement with a pipe to be cut and on further rotation of said gear the frictional contact of the cams, cutter, centering members and pipe causes both of said head members to rotate around the pipe to cut the same, said cutter and centering members having spring means for maintaining them normally in engagement with said cam.

11. In a pipe cutter, a pair of relatively rotatable members, cutting means carried by one of said members, cam means on the other member for engaging said cutting means, means for holding work to be engaged by the cutting means, and means for rotating one of said members to first cause movement of the cutting means by the cam means into engagement with the work and then automatically to rotate both members as a unit around the work to maintain a cutting action thereon.

12. In a pipe cutter, a pair of relatively rotatable members, cutting means carried by one of said members, cam means on the other member for engaging said cutting means, spring means engaging the cutting means and urging said cutting means into engagement with said cam means, means for holding work to be engaged by the cutting means, and means for rotating one of said members to first cause movement of the cutting means by the cam means into engagement with the work and then automatically to rotate both members as a unit around the work to maintain a cutting action thereon.

13. In a pipe cutter, a pair of relatively rotatable members, cutting means carried by one of said members, cam means on the other member for engaging said cutting means, spring means engaging the cutting means and urging said cutting means into engagement with said cam means, means for holding work to be engaged by the cutting means, means for rotating one of said members to first cause movement of the cutting means by the cam means into engagement with the work and then automatically to rotate both members as a unit around the work to maintain a cutting action thereon and centering means on the cutter carrying member adapted to be moved by the cams into engagement with the work and to prevent jamming of the cutting means should cutting action cease.

In testimony whereof we affix our signatures.

ALPHONSE O. BRUNGARDT.
FRENCH H. MOREHEAD.
JAMES W. MORRISSEY.